May 15, 1945.  H. M. EVJEN  2,375,776
ELECTRICAL PROSPECTING SYSTEM
Filed April 24, 1943  2 Sheets-Sheet 1
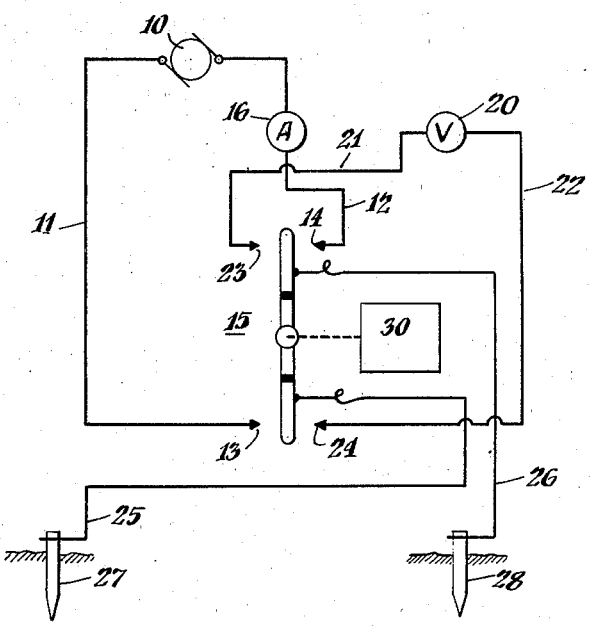
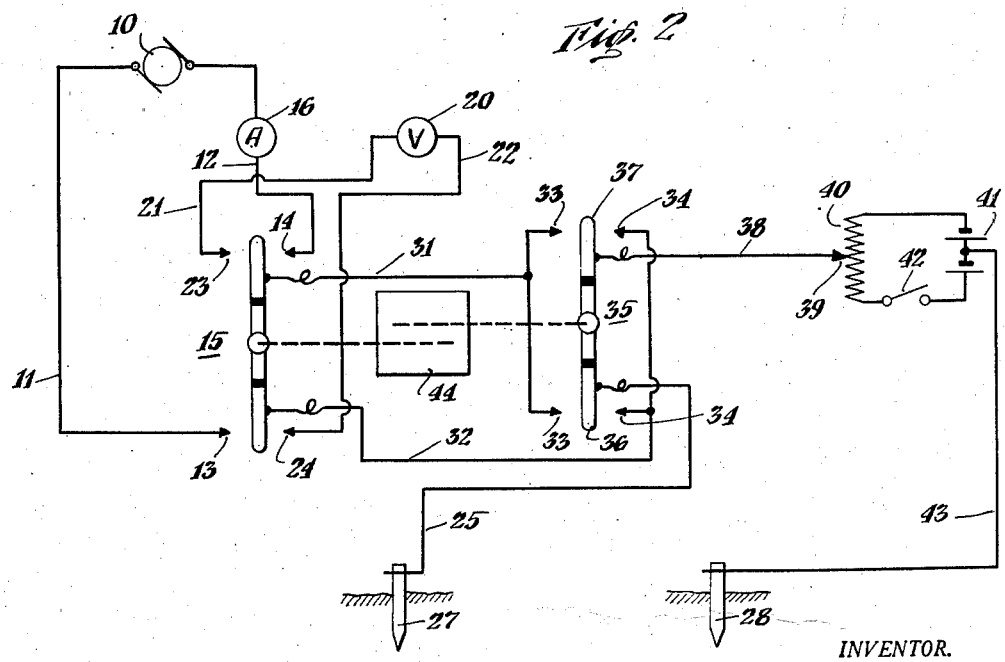
INVENTOR.
Haakon M. Evjen
BY
ATTORNEY May 15, 1945.  H. M. EVJEN  2,375,776
ELECTRICAL PROSPECTING SYSTEM
Filed April 24, 1943  2 Sheets-Sheet 2
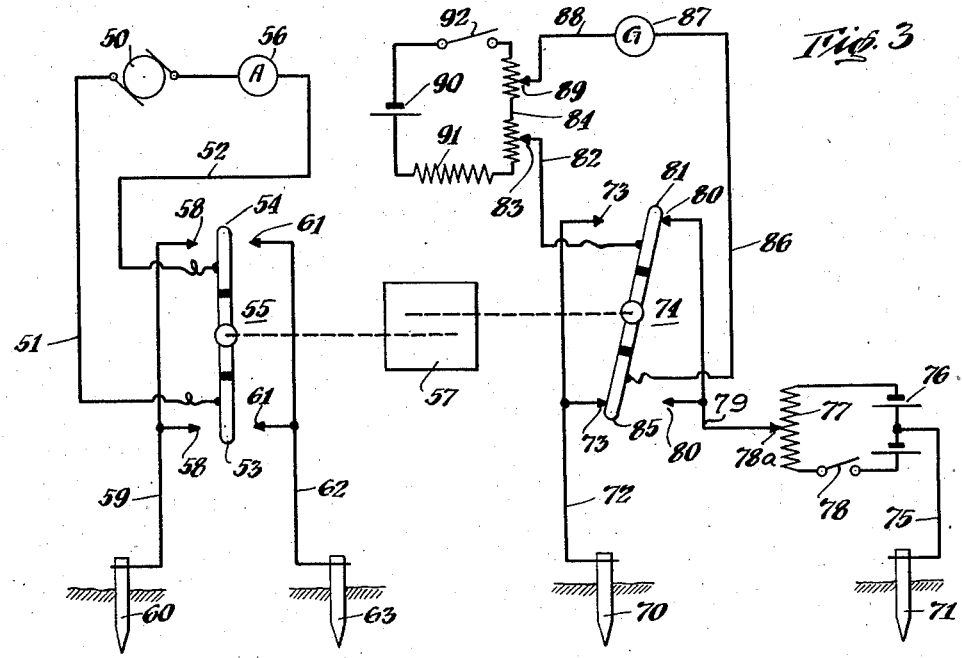
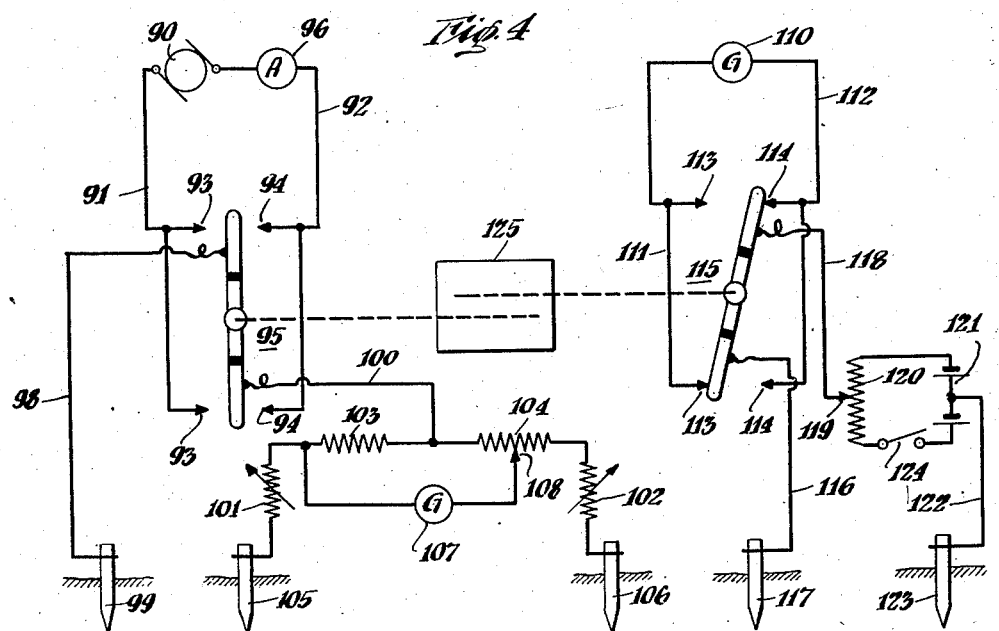
INVENTOR.
Haakon M. Evjen
BY
ATTORNEY Patented May 15, 1945

2,375,776

UNITED STATES PATENT OFFICE 2,375,776

ELECTRICAL PROSPECTING SYSTEM

Haakon M. Evjen, Houston, Tex., assignor to Nordel Corporation, Houston, Tex., a corporation of Delaware Application April 24, 1943, Serial No. 484,409

7 Claims. (Cl. 175—182)

This invention relates to a system for making geophysical explorations and has for an object to provide an electrical measuring system of the above type having novel and improved characteristics.

In accordance with the present invention low frequency interrupted or commutated currents are passed through the earth between earth current electrodes and measurements of the potential picked up by the same or other electrodes are made during current gap intervals. A significant physical quantity having the dimensions of an impedance is obtained from the ratio of the picked-up potential measured during the current gap interval to the total earth current. The value of this ratio depends on several factors such as the nature of the switching mechanism, the disposition of the electrodes and the electrical parameters of the ground.

This system of measurement has a wide field of application and may be used for both surface and bore hole explorations. It is applicable, for example, to the system described in the Evjen Patent 2,294,395 which employs two current electrodes and two potential electrodes or to the systems described in Evjen Patents, 2,172,557 and 2,169,685 which employ a plurality of current electrodes or to systems employing the same electrodes for current electrodes and potential electrodes as will be described.

In general, in all of these systems a current which is reversed at a controlled low frequency of, for example, from one-half to 20 cycles per second with predetermined current gap intervals at each reversal, is passed through the earth between the earth current electrodes. The picked-up potential which is obtained from the same electrodes or from separate potential electrodes is measured during the current gap intervals, that is, during the interval when no current is being passed into the ground. In operating a system of this type a plurality of readings are taken at each location under different conditions of frequency, electrode arrangement or current distribution and the results are plotted in the form of a curve from which significant indications may be obtained.

By measuring the pick-up potential during the current gap period the masking effect of the large in phase potential due to the impressed current and the effects of leakage are minimized.

A feature of the invention accordingly resides in the provision of circuits which are adapted to effect measurements of the picked-up potential during the current off intervals.

Other objects and advantages of the invention will be apparent as the nature of the invention is more fully disclosed.

This application is a continuation in part of my co-pending application Serial No. 477,015 filed Feb. 25, 1943, for Electrical prospecting system.

The invention will be better understood by referring to the following description taken in connection with the accompanying drawings in which certain specific embodiments thereof have been set forth for purposes of illustration.

In the drawings:

Fig. 1 is a diagrammatic representation of a geophysical prospecting system illustrating a simplified embodiment of the present invention;

Fig. 2 is a diagrammatic representation of a similar system illustrating an embodiment utilizing commutated current wherein the same electrodes are used for earth current electrodes and potential pick-up electrodes;

Fig. 3 is a similar diagrammatic representation illustrating an embodiment of the invention wherein separate current electrodes and potential pick-up electrodes are employed; and Fig. 4 is a diagrammatic representation illustrating the application of the invention to a system of measurements employing a plurality of earth current electrodes.

In the following description certain specific terms have been used for convenience in referring to various details of the invention. It is to be understood, however, that these terms are to be given as broad an interpretation as the state of the art will permit.

Referring to Fig. 1, a current source 10 is connected by lines 11 and 12 to fixed contacts 13 and 14 respectively of a motor driven, double-pole, double-throw switch 15 which may be of any suitable type, for example, of the type shown in Evjen Patent 2,314,874, dated March 30, 1943, which shows a switch having means to adjust the timing of the contact periods and of the change-over or gap periods. A current measuring device such as an ammeter 16 is shown as connected in the line 12.

A potential measuring device such as a voltmeter 20 is connected by lines 21 and 22 to fixed contacts 23 and 24 respectively of the double-pole double-throw switch 15. The movable contacts of the switch 15 are connected by lines 25 and 26 to earth electrodes 27 and 28 respectively. The switch 15 is adapted to be periodically reversed by any suitable driving means indicated diagrammatically at 30. The electrodes 27 and 28 may be disposed along the surface of the earth, in bore holes or in any other desired manner in accordance with the measurements to be taken.

In the operation of this system the switch 15 is adjusted to provide predetermined earth current periods, gap periods, and potential pick-up periods. During the earth current periods when the contacts 13 and 14 are closed, current which may be measured by the ammeter 16 is passed through the earth between the electrodes 27 and 28. During the potential pick-up periods when the contacts 23 and 24 are closed, the earth potential picked up by the electrodes 27 and 28 is measured by suitable means indicated as a voltmeter 20. These measurements may be repeated with different electrode arrangements or at difference frequencies. The ratios of the readings of the ammeter 16 to the readings of the voltmeter 20 provide a significant physical quantity which is a measure of the earth's characteristics.

In the embodiment of Fig. 2, provision is made for interrupting and reversing the earth current at predetermined intervals. In this embodiment the source 10 and voltmeter 20 are connected to the motor driven, double-pole, double-throw switch 15 in the manner set forth in connection with Fig. 1 and the corresponding parts have been given the same reference characters. In Fig. 2 the movable contacts of the switch 15 are connected by lines 31 and 32 to stationary contacts 33 and 34 respectively of a reversing switch 35, which may also be of the type set forth in the Evjen Patent 2,314,874 referred to above.

One movable contact 36 of the reversing switch 35 is connected by a line 25 to the earth electrode 27. The other movable contact 37 is connected by a line 38 to the variable contact 39 of a potentiometer 40. A battery 41 is connected across the potentiometer 40 and a switch 42 is provided to interrupt the battery circuit when measurements are not being taken. The mid-point of the battery 41 is connected by a line 43 to the earth electrode 28.

The switches 15 and 32 are interconnected by driving means, indicated diagrammatically at 44, for operation in unison, with the switch 35 operating at half the speed of the switch 15 and timed to reverse its connections during alternate reversing or gap periods of the switch 15.

In the operation of this system, with the switch 35 closed in one direction the switch 15 is first shifted to close contacts 13 and 14 and thereby pass a current through the earth in a predetermined direction between the electrodes 27 and 28. After a predetermined current interval the switch 15 is shifted to close the contacts 23 and 24 whereupon the potential picked-up by the electrodes 27 and 28 is applied to the voltmeter 20 for measurement. After a predetermined pick-up interval the switches 15 and 35 are both shifted in unison, whereupon the current from the source 10 passes through the earth between the electrodes 27 and 28 in the opposite direction. At the next reversal of switch 15 the picked-up potential, which is likewise of opposite direction, is indicated by the voltmeter 20. The cycle is then repeated.

The effect of the natural ground potential, which constitutes a direct self-potential between the electrodes 27 and 28, is eliminated by suitable adjustment of the potentiometer 40 to introduce a potential which balances or counteracts the self-potential. With the contact 39 at its central position no potential is introduced by the potentiometer. As the contact 39 is shifted in one direction or the other, however, a positive or negative bucking potential may be introduced. This adjustment may be made when no measurements are being taken, as for example when the earth current circuit has been interrupted for a period of time, so that the only effect on the voltmeter 20 is that produced by the normal earth potential. It may also be made during operation inasmuch as the reversal of the normal earth potential by the reversing switch 35 causes fluctuations of the voltmeter 20. The contact 39 may accordingly be adjusted to eliminate such fluctuations and any drift in the natural earth potential will be immediately perceived and can be compensated for by readjustment of the contact 39. The position of the contact 39 on the potentiometer 40 provides a measure of the normal ground potential which constitutes a second element of the log. The impedance measured in this way has characteristics that differ from the usual resistivity measurements. The observed value of this quantity depends on the frequency of commutation and may be plotted thereagainst to give a significant function.

In Fig. 3 the invention is shown as applied to a system involving separate earth current electrodes and potential pick-up electrodes. In this embodiment a source 50 of direct current is connected by means of lines 51 and 52 to the movable contacts 53 and 54 respectively of a motor driven reversing switch 55 which may be similar to the switch 15 above described. An ammeter 56 is shown as connected in the line 52 for purposes of regulation and control. The switch 55 is driven by a suitable driving means indicated diagrammatically at 57 which is provided with mechanism for rocking the movable contacts 53 and 54 at a predetermined frequency and with predetermined contact and gap intervals.

The reversing switch 55 is provided with a pair of stationary contacts 58 which are connected by a line 59 to an earth current electrode 60 and with a pair of stationary contacts 61 which are connected by a line 62 to an earth current electrode 63.

The potential pick-up circuit comprises a pair of pick-up electrodes 70 and 71 which are located within the field of influence of the earth current, either on the surface of the earth or vertically displaced along a bore hole for well-logging purposes. The pick-up electrode 70 is connected by a line 72 to stationary contacts 73 of a reversing switch 74 which is similar to the reversing switch 55 above described and is connected to be driven by the driving means 57 in unison with the switch 55 but with a phase displacement such that the contacts of the switch 55 are closed for definite periods while the switch 74 is open and vice versa.

The potential pick-up electrode 71 is connected by a line 75 to the mid-point of a battery 76. The battery 76 is connected across a potentiometer 77, a switch 78 being provided to interrupt the battery circuit when measurements are not being taken. The potentiometer 77 is provided with a movable contact 78a which is connected by a line 79 to the stationary contacts 80 of the switch 74.

A movable contact 81 of the switch 74 is connected by a line 82 to a movable contact 83 of a potentiometer 84. The movable contact 85 of the switch 74 is connected by a line 86 to a D. C. galvanometer 87 the other side of which is connected by a line 88 to a second movable contact 89 of the potentiometer 84. A battery 90 and a resistance 91 are connected in series across the potentiometer 84 to supply potential thereto. A switch 92 is provided for interrupting the battery circuit when measurements are not being taken.

In the operation of this system the electrodes 60, 63, 70 and 71 are arranged in accordance with the area to be investigated, for example, along the earth's surface or along a bore hole. In the latter event, one of the electrodes, for example, electrode 60, may be located at the earth's surface and the electrodes 63, 70 and 71 may be spaced vertically down the bore hole as is customary in well logging.

A current is passed through the earth between th electrodes 60 and 63 which has a definite value and frequency, the value being dependent upon the source 50 and the resistance of the earth current circuit and the frequency being dependent upon the frequency of operation of the reversing switch 55. This current is in the form of a flat topped wave having a predetermined current gap at each reversal. Referring to a complete cycle at 360°, the reversing switch 55 may be adjusted for a 120° current gap and a 60° current supply interval during each half cycle.

The earth potential picked up by the electrodes 70 and 71, which has a frequency corresponding to the frequency of the earth current, is rectified by the reversing switch 74, which is operated in unison with the switch 55 but is displaced in timing or phase relationship so that the contacts of the switch 74 are closed during the current gap intervals of the switch 55 and vice versa. For example, the switch 74 may be adjusted to have 120° gap intervals and 60° pick-up intervals during each half cycle, the 60° pick-up intervals being timed to occur during the 120° current gap of the switch 55, and the 60° current supply interval of the switch 55 being timed to occur during the 120° gap period of the switch 74. In particular the switches are adjusted to operate 90° out-of-phase.

The out-of-phase or imaginary component of the picked-up potential is thus rectified by the switch 74 and is applied as a uni-directional potential to the D. C. galvanometer 87. A balancing potential is also applied to the galvanometer 87 by means of the potentiometer 84, the contacts 83 and 89 of which are adjusted so that the potential drop therebetween opposes and balances the potential applied to the galvanometer 87 from the pick-up electrodes 70 and 71. A null balance is thus obtained and the value of the picked-up potential can be determined by the setting of the contacts 83 and 89 of the potentiometer 84. At this point of zero reading the time average of the current flowing in the potential circuit is zero. Consequently, the major effects of line resistance, contact resistance and the like are eliminated.

Any residual earth current which would tend to produce a fluctuation of the galvanometer 87 is balanced out by suitable adjustment of the potentiometer 77, which corresponds to the potentiometer 40 of Fig. 2, and may be adjusted in a similar manner. The adjustment is such as to eliminate fluctuation of the needle of the galvanometer 87.

After the above adjustments have been made a series of readings may be taken at different frequencies by a suitable operation of the control mechanism 57, and the variations with respect to frequency are indicative of the characteristics of the earth's strata.

During the periods of measurement the earth current as indicated by the ammeter 56 should remain as constant as possible, or the reading of the ammeter 56 may be taken when a balance has been obtained on the galvanometer 87 and the ratio of the earth current to the imaginary component of the picked-up potential may be used for the determinations.

In the embodiment of Fig. 4, the invention is shown as applied to the multi-electrode method of exploration. In this embodiment a source of direct current 90 is connected by lines 91 and 92 to fixed contacts 93 and 94 respectively of a reversing switch 95 which is similar to the reversing switch 55 of Fig. 3. An ammeter 96 is shown as connected in the line 92 for purposes of measurement. One movable contact of the switch 95 is connected by a line 98 to an earth current electrode 99. The other movable contact of the switch 95 is connected by a line 100 to the midpoint of a network comprising a pair of variable resistances 101 and 102, a fixed resistance 103 and a potentiometer 104 connected in series between earth current electrodes 105 and 106. A galvanometer 107 is connected across the fixed resistance 103 to a variable contact 108 on the potentiometer 104.

A galvanometer 110 is connected by lines 111 and 112 to fixed contacts 113 and 114 respectively of a reversing switch 115, which is similar to the reversing switch 74 of Fig. 3. One movable contact of the reversing switch 115 is connected by a line 116 to an earth potential electrode 117. The other movable contact of the switch 115 is connected by a line 118 to a contact 119 on a potentiometer 120 across which a battery 121 is connected. The midpoint of the battery 121 is connected by a line 122 to the other earth potential electrode 123. A switch 124 is provided for interrupting the battery circuit when measurements are not being taken. The switches 95 and 115 are driven in unison, but at a 90° phase displacement by suitable driving means 125 and are adjusted for alternate operation as set forth in connection with switches 55 and 74 of Fig. 3.

In the operation of this embodiment the variable impedances 101 and 102 are so adjusted that zero potential exists between electrodes 117 and 123, as indicated by the galvanometer 110.

When this state exists the sliding contact 108 of the potentiometer 104 is adjusted to give a zero reading on the galvanometer 107. This gives a measure of the ratio of the current in the two branches represented by the electrodes 105 and 106. If, for example, the scale of the potentiometer 104 is divided into a hundred divisions, the setting for a null reading provides a direct reading on a percentage basis of the ratio of the current through the electrodes 105 and 106. A set of readings taken under different conditions of frequency, electrode spacing etc., may be plotted for determining the characteristics of the earth.

Although certain specific embodiments of the invention have been shown for purposes of illustration, it is to be understood that the invention is not to be restricted thereto, but that various changes and modifications may be made therein as will be readily apparent to a person skilled in the art. The invention is to be limited only in accordance with the scope of the following claims.

What is claimed is:

1. The method of electrical prospecting which comprises passing a current from a direct current source through the earth between one current electrode and a plurality of other spaced current electrodes, periodically interrupting and reversing said current at a contolled low frequency with controlled current gap periods at each interruption, picking up during said current gap periods the ground potential between a pair of spaced pick-up electrodes, adjusting the current distribution between said current electrodes to nullify said ground potential and measuring the ratio of the currents supplied to the various current electrodes to obtain said null balance.

2. A system for electrical prospecting comprising an earth current circuit including a source of direct current, a pair of spaced earth electrodes and a reversing switch connected between said source and said electrodes, means actuating said reversing switch periodically to interrupt and reverse the earth current at a predetermined controlled low frequency with a predetermined current gap period at each interruption, a potential circuit including a D. C. potential measuring instrument, means picking up the potential difference between spaced points within the field of influence of said earth current, a reversing switch in said potential circuit timed to convert said picked-up potential to a unidirectional potential suited to actuate said measuring instrument, connections applying said unidirectional potential to said measuring instrument, said reversing switches being connected for actuation in unison but displaced in phase so that said potential circuit is closed only during said current gap periods.

3. A system for electrical prospecting as set forth in claim 2 in which the two reversing switches are connected for actuation with a 90° relative phase displacement and are adjusted for alternate 120° gap periods and 60° contact periods in each half cycle.

4. The method of electrical prospecting which comprises passing through the earth an input current in the form of a series of similar pulses, successive pulses being in opposite directions and being spaced by a gap period during which no current flows, said gap periods and said pulse periods together forming a repeated pattern of controlled frequency, and picking up the potential between spaced points within the field of influence of said input current during the current gap periods, separating the component of said picked-up potential due to the input current from other components, and measuring said first component.

5. The method of electrical prospecting which comprises passing through the earth an input current in the form of a series of similar pulses, successive pulses being in opposite directions and being spaced by a gap period during which no current flows, said gap periods and said pulse periods together forming a repeated pattern of controlled frequency, picking up the alternating potential between spaced points within the field of influence of said earth current during the current gap periods, reversing said picked-up potential to produce a unidirectional potential, and supplying the unidirectional potential to a direct current measuring device, and eliminating the effect on said measuring device of picked-up potential components other than the component due to said input current.

6. A system for electrical prospecting comprising an earth current circuit including spaced earth current electrodes, timed means supplying to said electrodes for passage through the earth a current in the form of a series of similar pulses, successive pulses being in opposite directions and being spaced by a gap period during which no current flows, said gap periods and said pulse periods together forming a repeated pattern of controlled frequency, probe electrodes in the earth within the field of influence of said earth current, and a measuring circuit connected to said probe electrodes including means to separate the alternating component of the picked up potential from the unidirectional component thereof, a circuit responsive only to said first component and a measuring device connected in said last circuit to measure said first component.

7. A system for electrical prospecting comprising an earth current circuit including spaced earth current electrodes, means supplying to said electrodes for passage through the earth a current in the form of a series of similar pulses, successive pulses being in opposite directions and being spaced by a gap period during which no current flows, said gap periods and said pulse periods together forming a repeated pattern of controlled frequency, probe electrodes in the earth within the field of influence of said earth current, a potential measuring circuit connected to said probe electrodes including a D. C. potential measuring instrument, and a reversing switch timed to close said measuring circuit only during current gap periods and to convert the picked-up potential into a unidirectional potential suited to actuate said measuring instrument.

HAAKON M. EVJEN.